(12) United States Patent
Morgan et al.

(10) Patent No.: US 12,424,188 B2
(45) Date of Patent: Sep. 23, 2025

(54) HEIGHT ADJUSTABLE SCREEN INTERFACE AND DISPLAY

(71) Applicant: NCR Voyix Corporation, Atlanta, GA (US)

(72) Inventors: Kip Oliver Morgan, Atlanta, GA (US); Gina Torcivia Bennett, Lawrenceville, GA (US)

(73) Assignee: NCR Voyix Corporation, Atlanta, GA (US)

(*) Notice: Subject to any disclaimer, the term of this patent is extended or adjusted under 35 U.S.C. 154(b) by 0 days.

(21) Appl. No.: 18/074,598

(22) Filed: Dec. 5, 2022

(65) Prior Publication Data
US 2024/0185815 A1    Jun. 6, 2024

(51) Int. Cl.
G09G 5/00    (2006.01)
G06F 3/02    (2006.01)
G06F 3/0488    (2022.01)
H04N 5/655    (2006.01)

(52) U.S. Cl.
CPC ........... G09G 5/006 (2013.01); G06F 3/0227 (2013.01); G06F 3/0488 (2013.01); H04N 5/655 (2013.01); G09G 2340/0471 (2013.01)

(58) Field of Classification Search
CPC ............ G09G 5/006; G09G 2340/0471; G06F 3/0227; G06F 3/0488; H04N 5/655
See application file for complete search history.

(56) References Cited

U.S. PATENT DOCUMENTS

| | | | | |
|---|---|---|---|---|
| 6,822,812 | B1* | 11/2004 | Brauer | A47C 7/72 359/743 |
| 2009/0279055 | A1* | 11/2009 | Amano | G03B 3/00 353/101 |
| 2010/0201779 | A1* | 8/2010 | Inderrieden | G06Q 20/10 715/740 |
| 2013/0069982 | A1* | 3/2013 | Hall | G06F 3/0484 345/650 |
| 2014/0192089 | A1* | 7/2014 | Honda | G06F 3/0416 345/661 |
| 2017/0160906 | A1* | 6/2017 | Ju | G06F 3/04845 |
| 2017/0176807 | A1* | 6/2017 | Awazu | G02F 1/133308 |
| 2018/0164976 | A1* | 6/2018 | Ho | G07B 1/00 |
| 2021/0096641 | A1* | 4/2021 | VanBlon | G06F 3/0482 |
| 2022/0415224 | A1* | 12/2022 | Kim | G06F 3/04847 |

* cited by examiner

*Primary Examiner* — Sahlu Okebato
(74) *Attorney, Agent, or Firm* — Schwegman Lundberg & Woessner, P.A.

(57) ABSTRACT

A viewing height of a rendered transaction interface screen on a transaction display is controlled by or automatically adjusted for a customer performing a transaction at a transaction terminal. The display can physically be raised and lowered along a post to achieve a desired viewing height or only a portion of the viewable surface area for the display is occupied by a transaction interface screen for the transaction with the location of the portion controlled by or auto adjusted on behalf of the customer. In an embodiment, another portion of the viewable surface area not currently occupied by the transaction interface screen can be used to render additional information such as advertisements and the advertisement portions can be dynamically changed based on changes made to the location of the transaction interface screen.

17 Claims, 7 Drawing Sheets

HEIGHT ADJUSTABLE SCREEN INTERFACE AND DISPLAY

BACKGROUND

Portrait mode displays are increasingly popular in the retail industry. The larger viewable surface area of these displays are easier to view and read by customers. Unfortunately, the interfaces which render viewable screens of information on these displays to customers have not yet caught up with the technology.

At the same time, customers are performing self-checkouts at self-service terminals (SSTs) of retailers in greater numbers than ever before. SSTs do not accommodate individuals of all heights. People in wheelchairs and those with height disadvantages have a hard time accessing SSTs or kiosks.

The legacy user interfaces of the SSTs were not designed with portrait mode displays in mind and the rendered screens of information do not fit well on these displays. The legacy user interfaces rely on touch inputs from the customers such that taller than average people have problems accessing touch options. Viewing rendered screens on portrait mode displays at non-front-on angles causes text to be difficult to read and distorts colors perceived by the customers.

SUMMARY

In various embodiments, a system and methods for height adjustable screen interfaces and/or displays are presented. A viewing height of a rendered transaction interface screen on a transaction display is manually or automatically adjusted for a customer performing a transaction at a transaction terminal. In an embodiment, the display is a portrait mode display with a larger viewable surface area. In an embodiment, the display is physically raised and lowered along a post to achieve a desired height. In an embodiment, only a portion of the viewable surface area of the display is occupied by a transaction interface screen for the transaction and the location of the portion can be adjusted by or on behalf of the customer. In an embodiment, another portion of the viewable surface area not currently occupied by the transaction interface screen can be used to render additional information such as advertisements and the advertisement portions can be dynamically changed based on changes made to the location of the transaction interface screen.

DETAILED DESCRIPTION

Figure 1A:
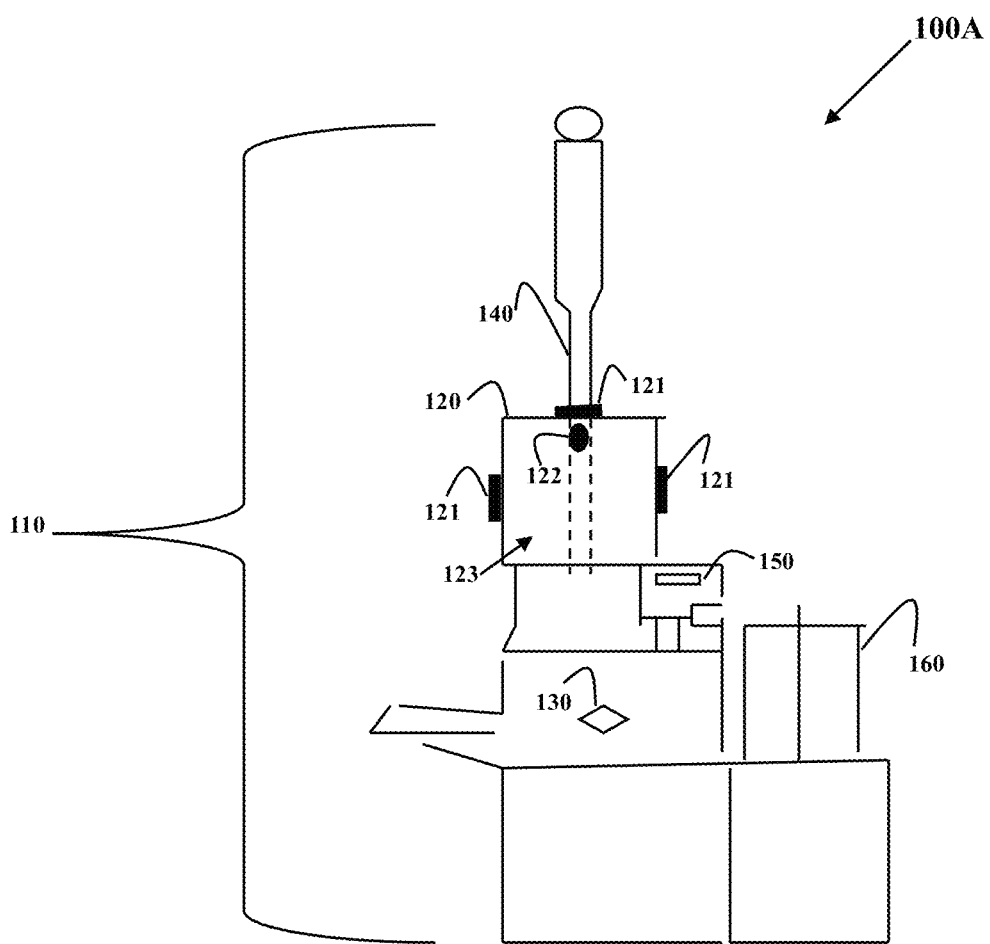
FIG. 1A is a diagram of a transaction terminal with height adjustable screen interfaces and/or a height adjustable display, according to an example embodiment.

As stated above, legacy user interfaces of self-service terminals (SSTs) were not designed and coded for larger viewable surfaces areas such as those associated with portrait mode displays. Additionally, there are very few governmental regulations with respect to the accessibility of SSTs to disabled individuals, but this is changing, and accessibility regulations are now foreseeable in the industry. Unfortunately, very few retailers are prepared to address the coming accessibility regulations.

These issues are solved with the teachings presented herein and below. The physical display and/or the viewable rendered screens from the transaction interface are height adjustable. Adjustments can be physically performed via one or more grips and/or via a physical control button located separate from the display itself. The viewable rendered screens can be height adjusted via soft tab buttons rendered with the screens, via the physical control button, via interface options rendered with the screens, and/or via automatic height adjustment based on the location of a customer's eyes while standing in front of the display at a transaction terminal. The soft tabs can be touched on the display by a customer at the terminal to move a primary transaction interface screen upward or downward to a preferred location on the viewable surface area of the display.

When the display is a portrait mode display with a large viewable surface area, the primary transaction interface screen does not have to occupy all of the viewable surface area. In these cases, unused areas that are not associated with the primary transaction interface screen can be used to render advertisements or promotions to the customers. The advertisement/promotion areas can be dynamically relocated within the viewable surface area when the primary transaction interface screen is height adjusted for a customer for a transaction by the customer at the terminal.

As used herein the terms "consumer," "user," and "customer may be used synonymously and interchangeably. This refers to an individual that is operating a transaction terminal for a transaction.

As used herein "height" is intended to mean a location of rendered information within a display's viewable surface area or the actual physical height of a display above a surface upon which a terminal rests. The height can be relative to a customer standing or sitting in front of the display. The height can be manually adjusted or automatically adjusted as described herein and below.

The term "optimal" as used herein in below with respect to coordinates of a screen within a viewable surface area of a display, location of the screen within the viewable surface area, distance and angles of a user's eyes, height, and eye position refer to a calculated value for positioning a display or positioning a primary transaction interface screen within the viewable surface area of the display based on a predefined distance, height, and angle associated with the user's eyes relative to a top or center of the primary transaction interface screen. That is, a top and/or center of the primary transaction interface screen is optimal when it is height adjusted relative to the user's eyes at the predefined distance, height, and/or angle.

FIG. 1A is a diagram 100A of a transaction terminal 110 with height adjustable screen interfaces and/or a height adjustable display 120, according to an example embodiment t. The terminal 110 is shown schematically in greatly simplified form, with only those components relevant to understanding of one or more embodiments (represented herein) being illustrated. The various components are illustrated, and the arrangement of the components is presented for purposes of illustration only. It is to be noted that other arrangements with more or less components are possible without departing from the teachings of height adjustable screen interfaces and/or a height adjustable display presented herein and below.

Moreover, various components are implemented as one or more software modules, which reside in non-transitory storage and/or hardware memory as executable instructions that when executed by one or more hardware processors perform the processing discussed herein and below.

Terminal 110 includes a display 120, a physical navigation control 130, a display post 140, a card reader 150, and a bag holder 160. Display 120 includes a viewable surface area 123, optionally manual height adjustment grips 121, and optionally an integrated camera or eye tracking sensor 122.

In an embodiment, the display 120 is a portrait mode display with a large viewable surface area 123. In an embodiment, the display 120 is a non-portrait mode display with a smaller viewable surfaces area 123.

In an embodiment, navigational control 130 is a diamond shaped control with a pressable button in the center of the control 130 and pressable buttons to the right, left, up, and down. When a customer approaches the terminal 110 for a transaction, the customer can press the up or down buttons of control 130 to physically move display 120 along post 140 up and down; the display 120 stops moving up or down along post 140 when the customer stops pressing the up or down button of control 140. When the display 120 is a portrait mode display and a customer presses the up or down button of control 140, the transaction interface that is rendering the primary transaction screen on the viewable surface area of the display 120 moves the location of the primary transaction screen on the viewable surface area of the display from a default location within the viewable surface area upward or downward to a customer-determined height within the viewable surface area of display 120.

In an embodiment, grips 121 permit a customer to grasp a side or a top of the display 120 and relocate the display along post 140 upward or downward from its initial location on post 140. Movement of the display 120 along the post can be mechanically driven along a rail with pins, the pins disengage the rail when the customer lifts or pulls on a grip 121 and re-engage the rail when the customer lets go of the grip 121. Movement of the display 120 along the post can also be driven electromechanically utilizing a motor that is activated to raise and lower the display 120 along a rail of the post 140 when the customer touches a sensor embedded in grips 121.

In an embodiment, camera or eye tracking sensor 122 provides images or information for determining a distance of a customer's eyes from the viewable surface area of the display 120 and an angle with which the customer's eyes are currently viewing the viewable surface area. An optimal eye position determining application processes on terminal 110 and automatically moves the display 120 along the post 140 or automatically relocates the primary transaction interface screen within the viewable surface area to an optimal determined location for viewing by the customer.

Figure 1B:
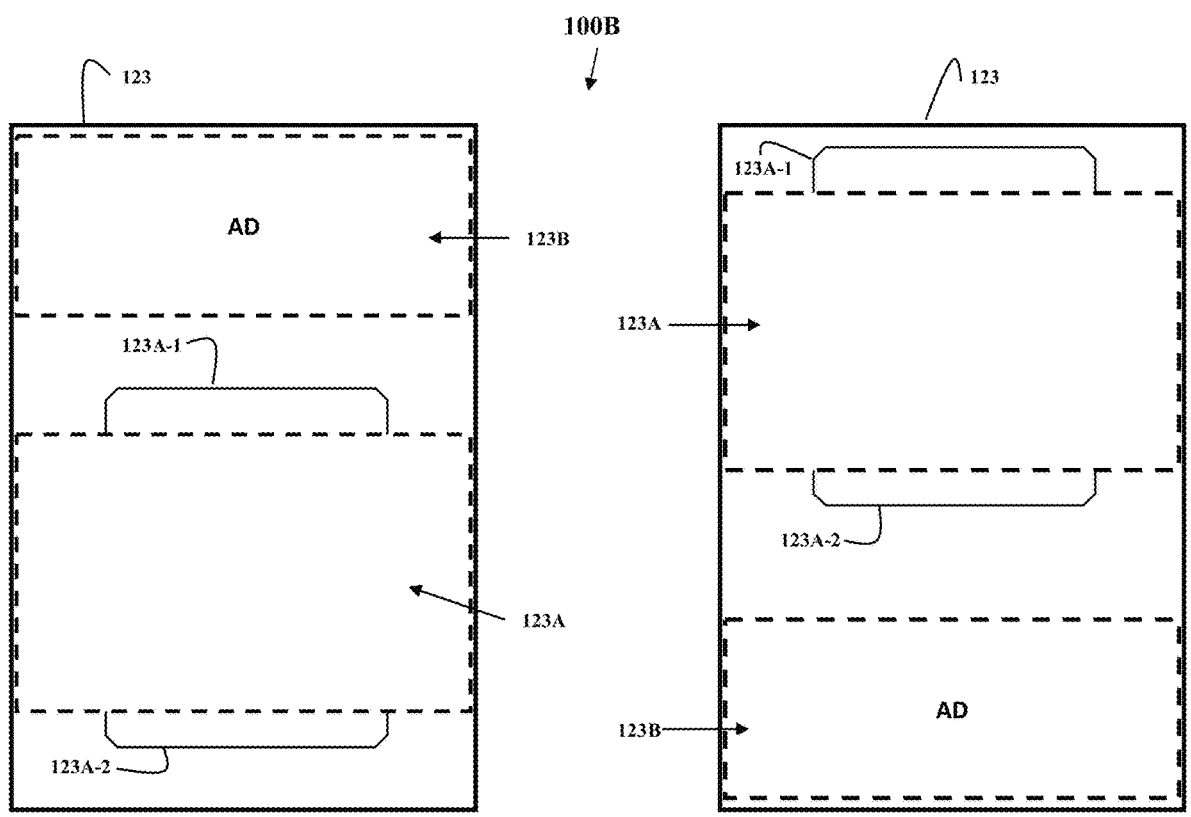
FIG. 1B are diagrams of height adjustable screens rendered on a display of a transaction terminal, according to an example embodiment.

FIG. 1B are diagrams 100B of height adjustable screens rendered on a display of a transaction terminal, according to an example embodiment. Two viewable surface areas 123 are illustrated for display 120 in FIG. 1B. FIG. 1B is relevant to an embodiment when the display 120 is a portrait mode display with a larger viewable surface area.

The transaction interface for terminal 110 does not have to be changed. That is, the source code associated with an existing transaction interface does not require any changes with the teachings presented herein. Rather coordinates for the primary transaction interface screen 123A of transaction interface are assigned a default location within the viewable surface area 123. The lefthand diagram illustrates the default location of the primary transaction interface screen 123A as being at or adjacent to a bottom of the viewable surface area 123 whereas the righthand diagram illustrates the default location of the primary transaction screen 123A being at or adjacent to a top of the viewable surface area 123.

Outside of the location assigned to the primary transaction interface screen 123A are rendered tabs 123A-1 and 123A-2 situated at a top and a bottom of the primary transaction interface screen 123A. An interface agent of terminal 110 can control and relocate the location of the primary interface screen 123A via touching by the customer in an area of the viewable surface area 123 of tabs 123A-1 and 123A-2. A customer touch and drag upward on the top tab 123A-1 with a release of the touch causes the agent to move/relocate the primary transaction interface screen 123A from a bottom position of the viewable surface area 123 as shown in the lefthand diagram to a top position of the viewable surface area 123 as shown in the righthand diagram. Conversely, a customer touch and drag downward on the bottom tab 123A-2 with a release of the touch causes the agent to move/relocate the primary transaction interface screen 123A from a top position of viewable surface area 123 as shown in the righthand diagram to a bottom position of the viewable surface area 123 as shown in the lefthand diagram.

Additionally, ads can be rendered by the agent in locations of the viewable surface area that are not associated with the primary transaction interface screen 123A. The agent can automatically relocate and render an advertisement screen 123B when the primary transaction interface screen 123A is relocated into a location associated with where the advertisement screen 123B was originally located within the viewable surface area 123. For example, in the lefthand diagram the primary transaction interface screen 123A is located adjacent to a bottom of the viewable surface area 123 and the agent renders an advertisement (ad) screen 123B in an area above a top of the primary transaction interface screen 123A within the viewable surface area 123. When the primary transaction interface screen 123A is relocated adjacent to a top of the viewable surface area 123, the agent automatically relocates the ad screen 123B adjacent to a bottom of the viewable surface area 123.

Figure 1C:
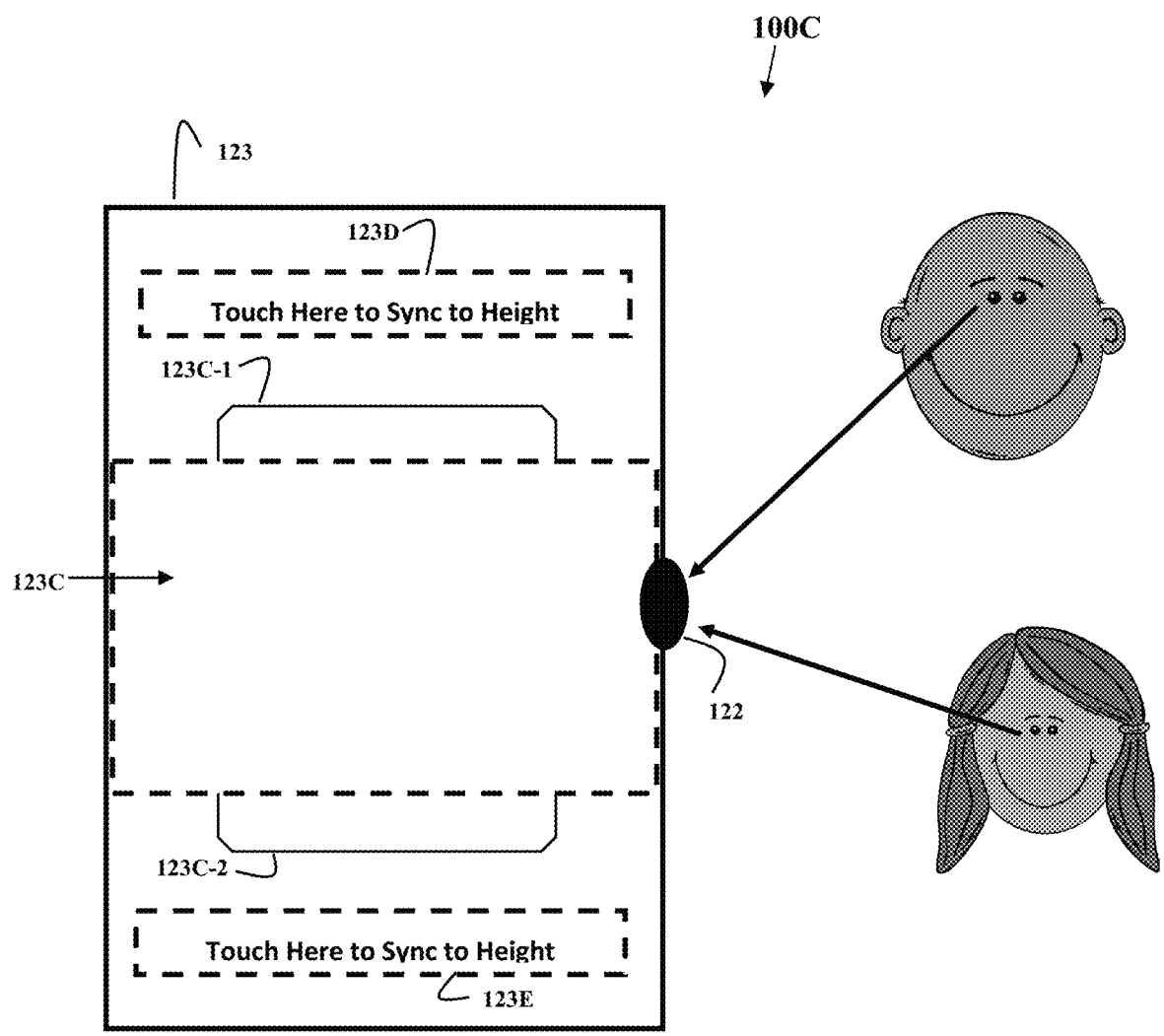
FIG. 1C is a diagram of an automatically adjustable screen height rendered on a display of a transaction terminal, according to an example embodiment.

FIG. 1C is a diagram 1000 of an automatically adjustable screen height rendered on a display of a transaction terminal, according to an example embodiment. Again, FIG. 1C is relevant to embodiments where the display 100 is a portrait mode display with a large viewable surface area 123.

The primary transaction interface screen 123C is by default located within a substantial center of the viewable surface area 123 by the agent. Again, the agent includes two tabs 123C-1 and 123C-2 above a top and below a bottom of the primary transaction interface screen 123C for a customer to touch and drag within the viewable surface area 123 to a customer desired height and location.

FIG. 1C also illustrates two additional touch options rendered within the viewable surface area 123. The topmost option 123D when touched by a customer causes the primary transaction interface screen 123C to be relocated by the agent from the substantial center of the viewable surface area 123 to a location that is adjacent to a top of the viewable surface area 123. The bottommost option 123E when touched by the customer causes the primary interface screen 123C to be relocated by the agent from the substantial center of the viewable surface area 123 to a location that is adjacent to a bottom of the viewable surface area 123.

FIG. 1C also illustrates an automatic height adjustment of the primary transaction interface screen 123C from its current location to a location within the viewable surface area 123 that is optimal for viewing and touch interaction by a given customer. Camera or eye tracking sensor 122 captures images or information processed to determine a distance and an angle of the customer's eyes. An algorithm, discussed below with FIG. 1D, is processed to determine for the agent an optimal location for the primary transaction interface screen 123C within the viewable surface area 123 based on height of the customer while at the terminal 110.

In an embodiment, options 123D and 123E can be touched by the customer to automatically trigger the height adjustment of primary transaction interface screen 123C within the viewable surface area 123 of display 120. A taller person can more easily touch option 123D while a smaller person or a person in a wheelchair can more easily touch option 123E. A touch of options 123D or 123E triggers collection of eye images and/or eye information from camera or sensor 122 which is processed by the algorithm. The output of algorithm is optimal coordinates for the four corners of the primary transaction interface screen 123C within the viewable surface area 123 for the customer who is present at the terminal 110 for a transaction.

Thus, options 123D and 123E can be touched once by a customer to move the primary interface screen 123 towards a top or a bottom of the viewable surface area 123. Alternatively, options 123D and 123E can be touched once to trigger automatic optimal height adjustment of the primary interface screen 123C within the viewable surface area 123 based on the customer's height determined from the customer's eyes when looking at display 120 at the terminal 110.

Figure 1D:
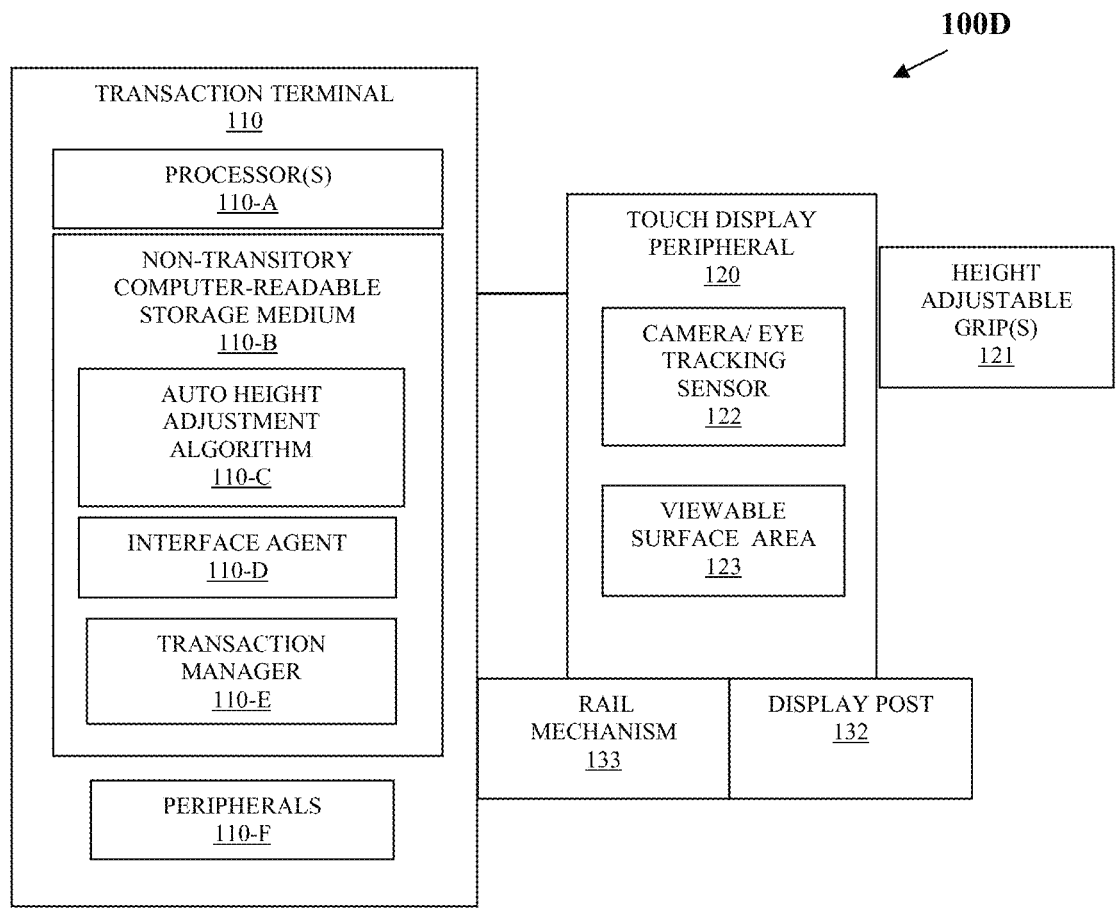
FIG. 1D is a diagram of a height adjustable screen interface and display of a transaction terminal, according to an example embodiment.

FIG. 1D is a diagram 100D of a height adjustable screen interface and display of a transaction terminal, according to an example embodiment. Again, terminal 110 is shown schematically in greatly simplified form, with only those components relevant to understanding of one or more embodiments (represented herein) being illustrated. The various components are illustrated, and the arrangement of the components is presented for purposes of illustration only. It is to be noted that other arrangements with more or less components are possible without departing from the teachings of height adjustable screen interfaces and/or height adjustable displays presented herein and below.

Terminal 110 includes one or more processors 110-A, computer-readable storage medium (medium) 110-B, peripherals 100-F, a touch display peripheral 120, optionally a rail mechanism 133, and optionally a display post 132. Medium 110-B includes executable instructions for an auto height adjustment algorithm 100-C, an interface agent 110-D, and a transaction manager 110-E. When the instructions are provided to processor 110-A, this causes processor 110-A to perform operations discussed herein and below for 110-C, 110-D, and 110-E.

Touch display peripheral 120 includes a viewable surface area 123. Optionally, display 120 includes a camera or an eye tracking sensor 122 and optionally, display 120 includes one or more height adjustment grips or controls 121.

Transaction manager 110-E includes a user interface for receiving inputs, including touch inputs, from a customer performing a transaction at terminal 110. The user interface is referred to as a "transaction interface" herein above and below.

In an embodiment, neither the transaction manager 110-E nor its transaction interface require any source code modifications for the teachings presented herein. In an embodiment, the operations discussed herein for interface agent 110-D are subsumed into an existing transaction manager as an enhanced transaction manager 110-E.

Interface agent 110-D maintains coordinates for a primary transaction interface screen 123A or 123C. The coordinates can be 4 coordinates for a current location of the 4 corners that define an area within the viewable surface area 123 that primary transaction interface screen 123A or 123C is being rendered by the transaction manager 110-E.

Interface agent 110-D also renders a variety of additional and extended user touch options within the viewable surface area 123 and outside the area that includes the primary transaction interface screen 123A or 123C. For example, tabs 123A-1 and 123A-2 can be rendered adjacent to a top portion and a bottom portion of the primary transaction interface screen 123A or 123C. As discussed above with diagram 100B of FIG. 1B, agent 110-D monitors touch input within areas defined by tabs 123A-1 and 123A-2 for touch and hold drags, which causes agent 110-D to relocate the primary transaction interface screen 123A or 123C to a user dragged location within the viewable surface area 123. Interface agent 110-D may also provide single touch options 123D and 123E above tab 123C-1 and below tab 123C-2, respectively as shown in diagram 1000 of FIG. 1C. A touch of option 123D can cause agent 110-D to move the primary transaction screen 123A or 123C upward within the viewable surface area 123 and/or activate camera or eye sensor 122 for automatic height adjustment by agent 110-D of primary transaction screen 123A or 123C within the viewable surface area 123 based on a position and angle of a customer's eyes relative to the viewable surface area 123 of display 120. Similarly, a touch of option 123E can cause agent 110-D to move the primary transaction screen 123A or 123C downward within the viewable surface area 123 and/or activate camera or eye sensor 122 for automatic height adjustment by agent 110-D of primary transaction screen 123A or 123C within the viewable surface area 123 based on a position and angle of a customer's eyes relative to the viewable surface area 123 of display 120.

When camera or eye tracking sensor 122 is activated by a touch of option 123D or 123E, auto height adjustment algorithm 110-C is processed. In an embodiment, algorithm 110-C uses an image of the eyes and a triangulation technique to compute the customer's eye height, 4 inches are added to the eye height to calculate a total eye height. The total eye height is divided by 4 to determine a modified eye height. The modified eye height is subtracted from a known height of the display 120 based on its dimensions and current position above the floor and the center of the viewable surface area 123 is placed at the calculated location. Algorithm 110-C provides the center coordinates to agent 110-D. Agent 110-D places a calculated center for the primary transaction interface screen 123A or 123C at the center of the viewable surface area 123. In an embodiment, algorithm 110-C assumes that any customer in front of display 120 is approximately one foot from the display 120. It is to be noted that the other algorithms can be processed from images or information provided by camera or sensor 122 to calculate a center of the viewable surface area 123 for which a center of the primary transaction interface screen 123A or 123C is oriented by agent 110-D.

In an embodiment, terminal 110 includes a rail mechanism 133 integrated into a display post 132. The rail mechanism 133 can be a rail with holes or rivets that interact with pins on the back outer housing of display 120 to lock a height of display 120 along post 132. The rail mechanism 133 can be mechanical driven through grips 121 or motor driven through a sensor of grips 121 or a navigation control peripheral 130 or 110-F. This permits a customer to manually raise and lower a height of display 120 along post 132 to a user defined height.

In an embodiment, a navigation control peripheral 130 or 110-F can be pressed by a customer using an up-arrow button or a down-arrow button as was described above with diagram 100A of FIG. 1A. This input received from control 130 or 110-F is received by agent 110-D causing agent 110-D to reposition the primary transaction interface screen 123A or 123C within the viewable surface area 123 accordingly.

In an embodiment, agent 110-D utilizes areas of the viewable surface area 123 which are not currently occupied by the primary transaction interface screen 123A or 123C to display ads as was discussed above with diagram 100B and FIG. 1B. The area occupied by ad screens 123B within the viewable surface area 123 is dynamically changed within the viewable surface area 123 based on any changes made to the location and areas of the primary transaction interface screen 123A or 123C within the viewable surface area 123.

In an embodiment, agent 110-D centers the primary transaction screen 123A or 123C within the viewable surface area 123 when a transaction is completed or when terminal 110 is reporting an idle status. In an embodiment, a default location of the primary transaction screen 123A or 123C can be provided as a configuration parameter to agent 110-D.

In an embodiment, navigation control 130 or 110-F is associated with customers of small stature or customers in wheelchairs and is provided as a transaction interface navigation tool. In these embodiments, whenever a customer presses any of the 5 buttons associated with the navigation control 130 or 110-F, agent 110-D relocates the primary transaction screen 123A or 123C from its current location within the viewable surface area 123 to a location that is adjacent to a bottom of the viewable surface area 123. This embodiment assumes that any customer activating the navigation control 130 or 110-F is going to provide inputs from the control 130 or 110-F rather than through touch inputs made in the primary transaction screen 123A or 123C such that the primary transaction screen 123A or 123C is at a bottommost location of the viewable surface area 123 for viewing by the customer.

In an embodiment, terminal 110 is a self-service terminal (SST) operated by a customer as was described above. In an embodiment, terminal 110 can be operated in a cashier-assisted mode of operation where the height adjustments of display 120 are performed on behalf of a cashier during a cashier-assisted transaction for the customer. In an embodiment, terminal 110 is an automated teller machine (ATM). In an embodiment, terminal 110 is a kiosk.

In an embodiment, any ads rendered by agent 110-D within ad screens 123B can be provided from a server (not shown in the FIGS.). That is, a store server and/or a third-party server can provide the ad content rendered within the ad screens 123B by agent 110-D. In an embodiment, the ad content is interactive such that links can be activated by touch of the customer to websites associated with the ad vendors; in this embodiment a browser is activated and processed on terminal 110 in connection with the ad content. In an embodiment, agent 110-D maintains metrics with respect to the ad contents interacted with by a customer. In an embodiment, the metrics are stored in a network-based data store for access by ad vendors, the store associated with terminal 110, and/or the retailer associated with the store.

Figure 2A:
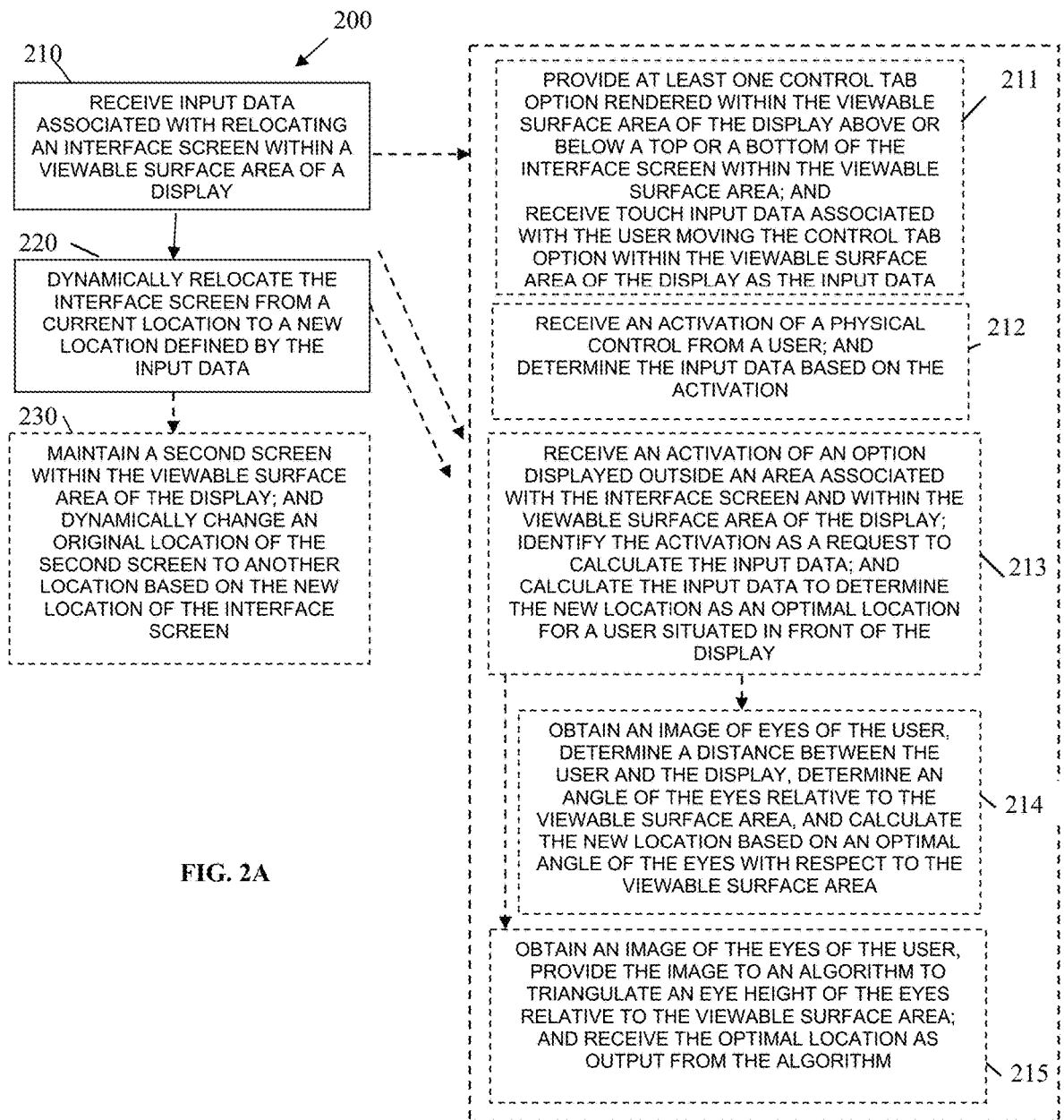
FIG. 2A is a flow diagram of a method for adjusting a height of a screen interface of a display for a transaction terminal, according to an example embodiment.
Figure 2B:
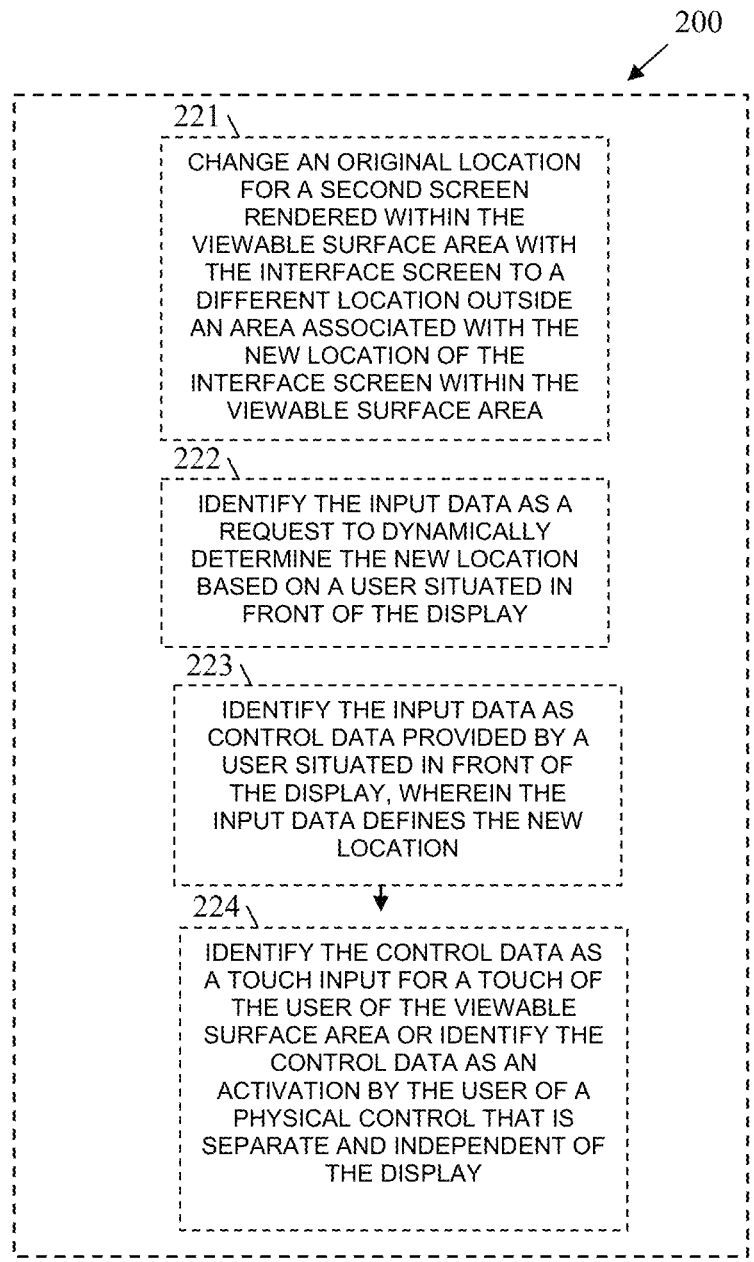
FIG. 2B is a flow diagram of the method of FIG. 2A illustrating additional embodiments, according to an example embodiment.

The embodiments of FIGS. 1A, 1B, 1C, and 1D and other embodiments are now discussed with reference to the FIGS. 2A, 2B, and 3. FIGS. 2A and 2B represent a flow diagram of a method 200 for adjusting a height of a screen interface of a display for a transaction terminal, according to an example embodiment. The software module(s) that implements the method 200 is referred to as a "transaction viewing manager." The transaction viewing manager is implemented as executable instructions programmed and residing within memory and/or a non-transitory computer-readable (processor-readable) storage medium and executed by a plurality of hardware processors of a plurality of hardware computing devices. The processors of the devices that execute the transaction viewing manager are specifically configured and programmed to process the transaction viewing manager. The transaction viewing manager has access to one or more networks during its processing. The networks can be wired, wireless, or a combination of wired and wireless.

In an embodiment, the device that executes the transaction viewing manager is terminal 110. In an embodiment, terminal 110 is an SST, an ATM, a kiosk, or an SST operated in a cashier-assisted mode of operation as a point-of-sale (POS) terminal. In an embodiment, transaction viewing manager is all or any combination of 110-C, 110-D, and/or 110-E.

At 210 (shown in FIG. 2A), the transaction viewing manager receives input data associated with relocating an interface screen 123A or 123C within a viewable surface area 123 of a display 120. The input data is location or position information for the interface screen 123A or 123C within the viewable surface area 123.

In an embodiment, at 211 (shown in FIG. 2A), the transaction viewing manager provides at least one control tab option 123A-1 and/or 123A-2 rendered within the viewable surface area 123 of the display 120 above or below a top or a bottom of the interface screen 123A or 123C within the viewable surface area 123. The transaction viewing manager receives touch input data associated with the user moving or dragging the control tab option 123A-1 and/or 123A-2 within the viewable surface area 123 of the display 120 as the input data.

In an embodiment, at 212 (shown in FIG. 2A), the transaction viewing manager receives an activation of a physical control from a user and the transaction viewing manager determines the input based on the activation. The physical control can be the navigation control 130 and/or sensors in the grips 121 on sides of the display 120.

In an embodiment, at 213 (shown in FIG. 2A), the transaction viewing manager receives an activation option displayed outside an area associated with the interface screen 123A or 123C and within the viewable surface area 123 of the display 120. The transaction viewing manager identifies the activation as a request to calculate the input data to determine the new location (discussed at 220 below) as an optimal location for a user situated in front of the display 120.

In an embodiment of 213 and at 214 (shown in FIG. 2A), the transaction viewing manager obtains an image of eyes of the user, determines a distance between the user and the display 120, determines an angle of the eyes relative to the viewable surface area 123, and calculates the new location based on an optimal angle of the eyes with respect to the viewable surface area 123. In an embodiment, the distance between the user and the display 120 can be assumed to be approximately 1 foot as was discussed above with FIGS. 1A-1D.

In an embodiment of 213 and at 215 (shown in FIG. 2A), the transaction viewing manager obtains an image of the eyes of the user, provides the image to an algorithm 110-C. The algorithm 110-C triangulates an eye height of the eyes of the user relative to the viewable surface area 123 and the transaction viewing manager receives the optimal location for the interface screen 123A and/or 123C as output from the algorithm 110-C.

At 220 (shown in FIG. 2A), the transaction viewing manager dynamically relocates the interface screen 123A or 123C from a current location within the viewable surface area 123 to a new location within the viewable surface area 123. The input data defines or provides instructions for determining the new location within the viewable surface area 123.

In an embodiment, at 221 (shown in FIG. 2B), the transaction viewing manager changes an original location for a second screen 123B rendered within the viewable surface area 123 with the interface screen 123A or 123C to a different location outside an area associated with the new location of the interface screen 123A or 123C within the viewable surface area 123. That is, the second screen 123B is dynamically relocated when the locations of the interface screen 123A or 123C changes within the viewable surface area 123.

In an embodiment, at 222 (shown in FIG. 2B), the transaction viewing manager identifies the input data as a request to dynamically determine the new location based on a user situated in front of the display 120. This is an automatic and optimal determined new location based on eye angles of the user looking at the viewable surface area 123 of the display 120.

In an embodiment, at 223 (shown in FIG. 2B), the transaction viewing manager identifies the input data as control data provided by a user situated in front of the display. The input data defines or provides instructions for resolving the new location for the interface screen 123A or 123C.

In an embodiment of 223 and at 224 (shown in FIG. 2B), the transaction viewing manager identifies the control data as a touch input for a touch of the user within the viewable surface area 123. Alternatively, the transaction viewing manager identifies the control data as an activation by the user of a physical control that is separate and independent of the display 120. The physical control can be the navigation control 130 or sensors associated with grips 121 of display 120.

In an embodiment, at 230 (shown in FIG. 2A), the transaction viewing manager maintains a second screen 123B within the viewable surface area 123 of the display 120. The transaction viewing manager dynamically changes an original location of the second screen 123B to another location based on the new location of the interface screen 123A or 123C.

Figure 3:
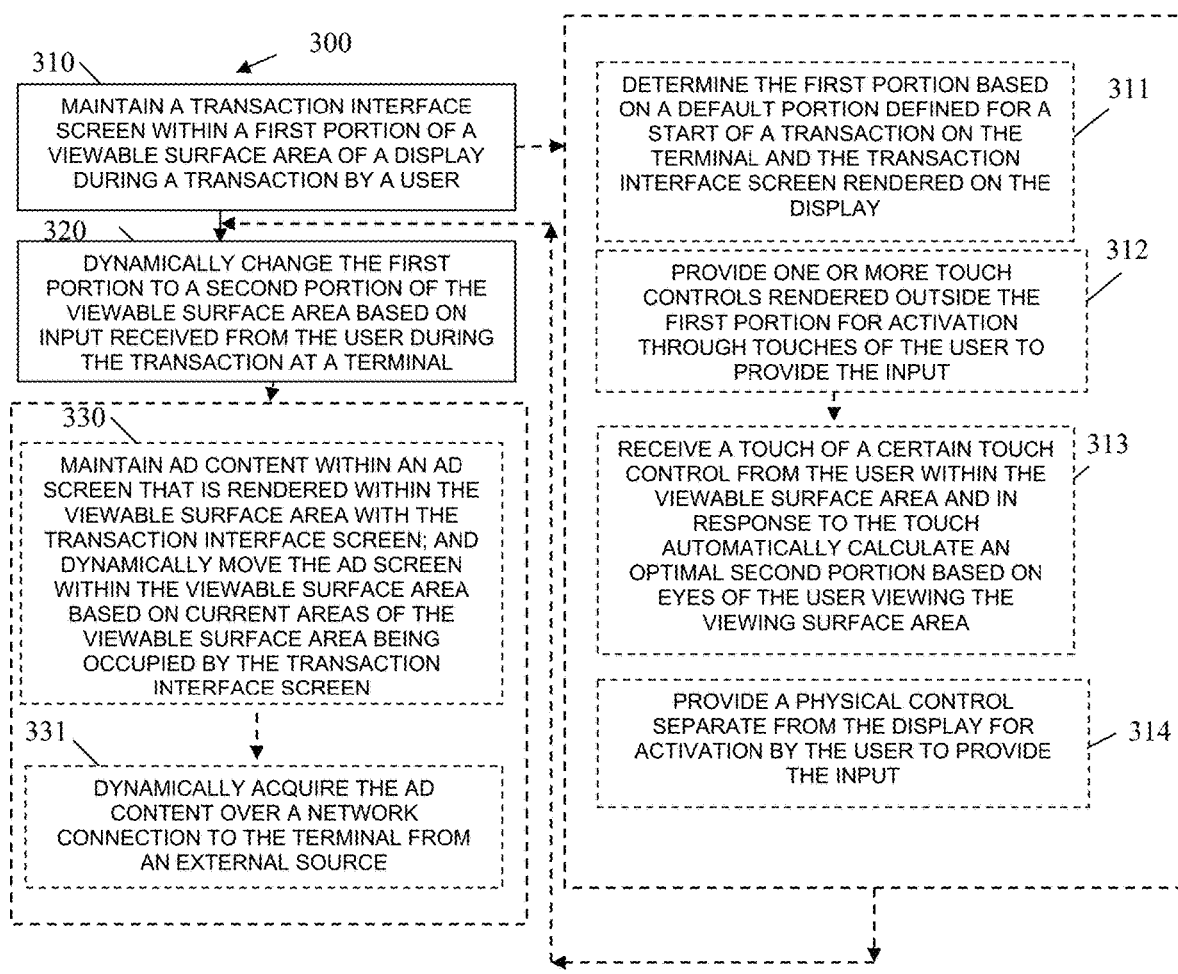
FIG. 3 is a flow diagram of another method for adjusting a height of a screen interface of a display for a transaction terminal, according to an example embodiment.

FIG. 3 is a flow diagram of a method 300 for adjusting a height of a screen interface of a display for a transaction terminal, according to an example embodiment. The software module(s) that implements the method 300 is referred to as an "interface viewing manager." The interface viewing manager is implemented as executable instructions programmed and residing within memory and/or a non-transitory computer-readable (processor-readable) storage medium and executed by one or more hardware processors of one or more hardware devices. The processors of the devices that execute the interface viewing manager are specifically configured and programmed to process the interface viewing manager. The interface viewing manager has access to one or more networks during its processing. The networks can be wired, wireless, or a combination of wired and wireless.

In an embodiment, the device that executes the interface viewing manager is terminal 110. In an embodiment, terminal 110 is an SST, an ATM, a kiosk, or a POS terminal.

In an embodiment, the interface viewing manager is all or any combination of 110-C, 110-D, 110-E, and/or method 200. The interface viewing manager presents another and, in some ways, an enhanced processing perspective from that which was discussed above with respect to the processing of terminal 110 in FIGS. 1A-1D and method 200 of FIGS. 2A and 2B.

At 310, the interface viewing manager maintains a transaction interface screen 123A or 123C within a first portion of a viewable surface area 123 of a display 120 during a transaction by a user at a terminal 110. In an embodiment, the display 120 is a portrait mode display 120.

In an embodiment, at 311, the interface viewing manager determines the first portion based on a default portion defined for a start of a transaction on the terminal 110. The transaction interface screen 123A or 123C is rendered within the viewable surface area 123 on the display 120 in the default portion before a transaction starts, while the terminal 110 is in an idle state, and after a transaction completes.

In an embodiment, at 312, the interface viewing manager provides one or more touch controls rendered outside the first portion for activation through touches of the user to provide the input. The one or more touch controls can include 123A-1, 123A-2, 123D, and/or 123E as discussed above.

In an embodiment of 312 and at 313, the interface viewing manager receives a touch of a certain touch control from the user within the viewable surface area 123. In response thereto, the interface viewing manager automatically calculates an optimal second portion to move the interface screen 123A or 123C to within the viewable surface area 123 based on eyes of the user viewing the viewing surface area 123 of the display 120. In this embodiment, the certain touch control is 123D or 123E as discussed above.

In an embodiment, at 314, the interface viewing manager provides a physical control that is separate from the display 120 for activation by the user to provide the input. This physical control can be navigation control 130 or sensors within grips 121 affixed to sides of the display 120 but separate from the display 120.

At 320, the interface viewing manager dynamically changes the first portion to a second portion of the viewable surface area 123 based on input received from the user during the transaction at the terminal 110. The input provides instructions or data for moving the transaction interface screen 123A or 123C from the first portion of the viewable surface area 123 to the second portion of the viewable surface area 123.

In an embodiment, at 330, the interface viewing manager maintains ad content within an ad screen 123B that is rendered within the viewable surface area 123 with the transaction interface screen 123A or 123C. The interface viewing manager dynamically moves the ad screen 123B within the viewable surface area 123 based on current areas of the viewable surface area 123 being occupied by the transaction interface screen 123A or 123C. That is, the ad screen 123 is concurrently rendered with the transaction interface screen 123A or 123C and its location dynamically changes as the locations of the transaction interface screen 123A or 123C are changed by the user or automatically on behalf of the user.

In an embodiment of 330 and at 331, the interface viewing manager dynamically acquires the ad content for the ad screen 123B over a network connection to the terminal from an external source. The external source can be a cloud, a retail server, a third-party server, an ad content server, etc.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   receiving input data associated with relocating an interface screen within a viewable surface area of a display, wherein the input data comprises touch input that activates an interface control for height adjustment, the interface control rendered outside the interface screen;
   automatically calculating an optimal viewing height for a user based on a viewing angle of the user relative to the viewable surface area of the display;
   determining a new location for the interface screen based on the viewing angle; and
   dynamically relocating the interface screen from a current location to the new location defined by the input data.

2. The method of claim 1 further comprising:
   maintaining a second screen within the viewable surface area of the display; and
   dynamically changing an original location of the second screen to another location based on the new location of the interface screen.

3. The method of claim 1, wherein receiving further includes:
   providing at least one control tab option rendered within the viewable surface area of the display above or below a top or a bottom of the interface screen within the viewable surface area; and
   receiving touch input data associated with a user moving the at least one control tab option within the viewable surface area of the display as the input data.

4. The method of claim 1, wherein receiving further includes:
   receiving an activation of a physical control from a user; and
   determining the input data based on the activation.

5. The method of claim 1, wherein receiving further includes:
   receiving an activation of an option displayed outside an area associated with the interface screen and within the viewable surface area of the display;
   identifying the activation as a request to calculate the input data; and
   calculating the input data to determine the new location as an optimal location for a user situated in front of the display.

6. The method of claim 5, wherein automatically calculating further includes obtaining an image of the eyes of the user, determining a distance between the user and the display, determining the viewing angle of the eyes relative to the viewable surface area, and calculating the new location based on an optimal angle of the eyes with respect to the viewable surface area.

7. The method of claim 5, wherein automatically calculating further includes obtaining an image of eyes of the user, providing the image to an algorithm to triangulate an eye height of eyes of the user relative to the viewable surface area, and receiving the optimal location as output from the algorithm.

8. The method of claim 1, wherein dynamically relocating further includes changing an original location for a second screen rendered within the viewable surface area with the interface screen to a different location outside of an area associated with the new location of the interface screen within the viewable surface area.

9. The method of claim 1, wherein dynamically relocating further includes identifying the input data as a request to dynamically determine the new location based on a user situated in front of the display.

10. The method of claim 1, wherein dynamically relocating further includes identifying the input data as control data provided by a user situated in front of the display, wherein the input data defines the new location.

11. The method of claim 10, wherein dynamically relocating further includes identifying the control data as touch input for a touch of the user of the viewable surface area or identifying the control data as an activation by the user of a physical control that is separate and independent of the display.

12. A method, comprising:
   maintaining a transaction interface screen of a transaction interface within a first portion of a viewable surface area of a display during a transaction by a user at a terminal;
   dynamically changing the first portion to a second portion of the viewable surface area based on input received from the user during the transaction, wherein the input includes activation of a physical control rendered outside and separate from the display, wherein the second portion is determined based on an optimal viewing height calculated using a predefined distance, height, and angle associated with eyes of the user relative to the display; and calculating, by an algorithm, the optimal viewing height, wherein the algorithm triangulates an eye height of the eyes of the user relative to the viewable surface area.

13. The method of claim 12, wherein maintaining further includes determining the first portion based on a default portion defined for a start of a transaction on the terminal and the transaction interface screen rendered on the display.

14. The method of claim 12 further comprising:
maintaining ad content within an ad screen that is rendered within the viewable surface area with the transaction interface screen; and
dynamically moving the ad screen within the viewable surface area based on current areas of the viewable surface area occupied by the transaction interface screen.

15. The method of claim 14, wherein maintaining the ad content further includes dynamically acquiring the ad content over a network connection to the terminal from an external source.

16. A system comprising:
a transaction terminal operated by a user during a transaction;
a display interfaced as a touch peripheral to the transaction terminal;
a control includes a camera or an eye tracking sensor to enable automatic adjustment of a viewing height based on an eye position of the user; and
the control configured to:
custom change the viewing height of the user with respect to a transaction interface screen rendered within a viewable surface area of the display during the transaction;
dynamically adjust the viewing height based on an eye tracking sensor input aligning a top edge of the transaction interface screen with a location of eyes of the user; and
maintain ad content within an ad screen that is rendered within the viewable surface area with the transaction interface screen and dynamically move the ad screen within the viewable surface area based on current areas of the viewable surface area occupied by the transaction interface screen.

17. The system of claim 16, wherein the control is one or more of:
a physical control configured to move the display up and down to adjust the viewing height; and
an interface control configured to be activated by the user within an area of the viewable surface area that is not associated with a transaction interface screen.

* * * * *